METHOD OF FORMING PERMANENT DATA ON MAGNETIC RECORDING MEDIA

Filed Dec. 29, 1955

*INVENTOR.*
WILLIAM R. MACLAY

*BY*
Dewey J. Cunningham
ATTORNEY

United States Patent Office 2,881,073

Patented Apr. 7, 1959

2,881,073

METHOD OF FORMING PERMANENT DATA ON MAGNETIC RECORDING MEDIA

William R. Maclay, Endicott, N.Y., assignor to International Business Machines Corporation, New York, N.Y., a corporation of New York Application December 29, 1955, Serial No. 556,355

7 Claims. (Cl. 96—36)

The present invention relates to a method of forming permanent data on magnetic recording media.

Present day digital computers make considerable use of magnetic media for storing binary information. This information is normally placed in storage tracks on the media under the control of a sync or timing track which synchronizes the storage operation and later the reading operation. One of the difficulties encountered in such devices is manifested when the record media comes under the influence of stray magnetic fields. Such disturbances may so distort the sync track that it has to be completely reproduced. The reproduction of a sync track is a difficult problem in itself but is even more of a problem where some information is in storage on the media and cannot be read out until the sync track is reproduced. Other situations exist where fixed information in the form of mathematics tables is destroyed due to stray magnetic fields.

An object of the present invention is to provide an improved method of producing permanent data on magnetic recording media.

Another object of this invention is to produce data on magnetic record media which is not affected by stray magnetic fields.

A further object of the invention is to provide an improved method of forming timing tracks on a magnetic drum or disc.

Still further it is an object of this invention to provide a method of forming permanent data on a record medium in a more accurate and less expensive manner than heretofore known.

Other objects of the invention will be pointed out in the following description and claims and illustrated in the accompanying drawings, which disclose, by way of examples, the principle of the invention and the best mode, which has been contemplated, of applying that principle.

Figure 1:
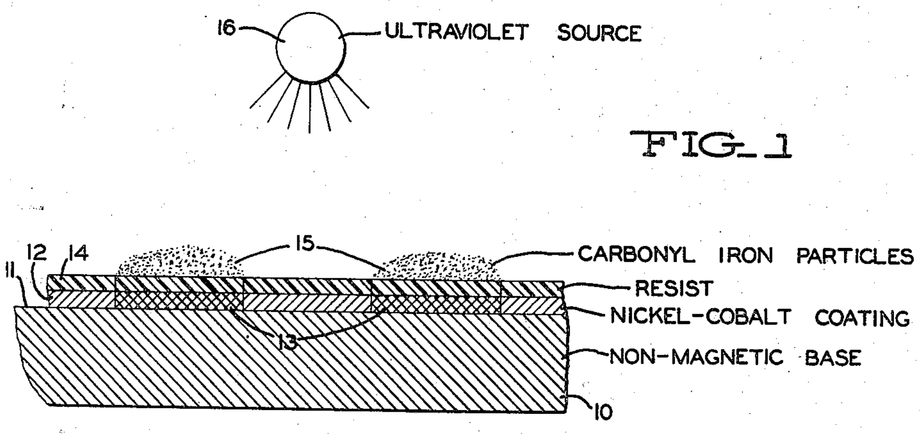
Figure 2:
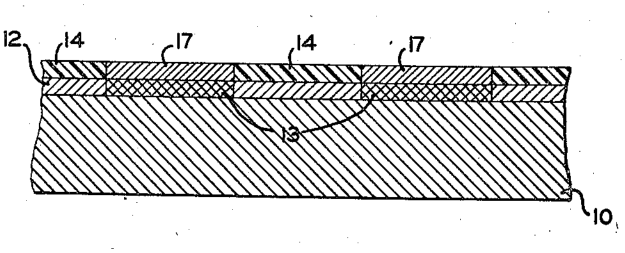
Figure 3:
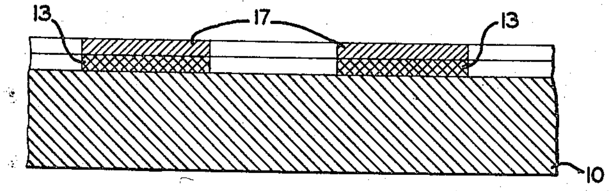
Figure 4:
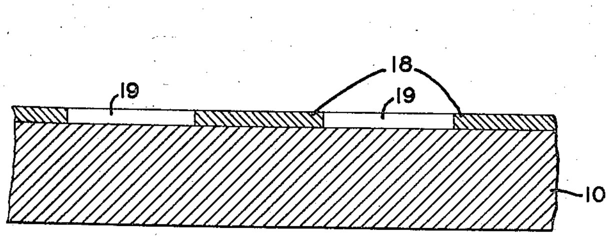

Figs. 1 through 3 are sectional views through a track of the drum which show progressive stages in practicing a preferred form of the present invention; and Fig. 4 is a sectional view through a track of the drum which shows the final appearance of another embodiment of the invention.

The present invention is equally applicable to many different forms of magnetic record media such as drums, discs, tape and the like. For the description herein, a magnetic drum type of recording medium will be discussed. The drum, which is normally constructed of nonmagnetic material, is machined and then plated with a film of magnetic material in the usual fashion. The drum is then placed in its frame and the data to be permanently placed therein is now recorded on the surface of the drum. A radiation sensitive medium such as a photosensitive emulsion or resist is then applied to the surface. Thereafter, the drum is dipped into a solution having extremely fine particles of magnetic material therein. These particles adhere to the magnetized spots on the drum surface and become visible. The surface of the drum is then exposed to light. Those areas beneath the particles adhering to the drum surface do not receive light and are therefore not hardened thereby. The drum surface is then treated to bring out a differentiation between those areas exposed to light and those not exposed to light, thereby leaving the desired pattern of data permanently fixed on the drum surface in the form of lands separated by reliefs which extend to the nonmagnetic base material of the drum.

A more detailed description of the present invention will now be given, reference being made to the drawings. In connection with the drawings, it will be appreciated that they are enlarged to some extent in order to clarify the relationship between the various parts thereof.

Magnetic drums are normally constructed of a nonmagnetic material and may be in the form of a casting. Alternatively, a metal framework may have a nonmagnetic sleeve, constructed from a material such as copper, placed thereon by a press fit. This nonmagnetic base is illustrated by reference numeral 10. The drum is machined in such a fashion as to produce a near perfect cylindrical surface at the outside periphery 11. Once this machining operation is completed, the cylindrical surface of the drum is plated with a magnetizable material which, by way of example, may be approximately eighty percent cobalt and twenty percent nickel by weight. This plating is usually in the order of .0005 inch in thickness and is illustrated by reference numeral 12, the plating being accomplished in accordance with standard practice. The drum is then installed in a suitable frame which, by way of example, may be the machine of which it will eventually form a part.

In the conventional manner, appropriate magnetic recordings are made thereon. The magnetized areas 13 of the coating 12 are shown by cross-hatching. These recordings may either be according to the discrete spot method or the non-return-to-zero method. In any event, the drum will comprise a plurality of magnetized areas 13 commonly termed "spots." In producing the recordings on the drum, the procedure would be to first provide the basic sync track. This sync track normally comprises a plurality of magnetized areas which are equally spaced in a track around the periphery of the drum. It is usually necessary to make a number of such recordings in different tracks on the drum in order to produce a perfect sync track, i.e., one in which the magnetized areas are precisely equally spaced. The best recording is then transferred and written in the track selected as the sync track. Additional sync tracks having fewer spots can now be produced from the basic sync track in a manner well known in the art. Furthermore, certain of the sync tracks may be used to place other data in selected tracks on the drum which is to be premanently recorded. For example, it may be desired to provide tabular data such as sine and tangent functions on the drum. In addition, it may be desirable to reproduce the basic sync track in other tracks of the drum for later selective recording.

Once all of the desired recordings are made, the drum is placed in a suitable fixture where it may be rotated about its axis and further rotated about an axis perpendicular to its axis. These fixtures are conventional in the photo-engraving art. A thin film of suitable light sensitive emulsion or resist 14 such as hot top or cold top enamel, is applied to the surface of the drum while it is rotating about its own axis. Thereafter the drum is rotated about both of the axes previously mentioned to produce an even film of the light sensitive material on the drum surface. In order to facilitate drying, heat may be applied to the emulsion while it is rotating.

The drum is then dipped in a suitable solution having extremely small particles of material therein which are capable of adhering to the resist over the magnetized areas of the drum. One such solution which I have found to be practical is a suspension of carbonyl iron in alcohol or some other liquid having rapid evaporation characteristics but which does not dissolve the light sensitive emulsion. The carbonyl iron used was Antara Chemicals Type "SF" which has a practical size of approximately three microns. Only the smaller particles remain in the alcohol solution after settling a short time. A suspension with only enough iron in it to make the liquid cloudy gives good results. The solution may be agitated sufficiently to keep the smaller particles in suspension.

The drum is then taken out of the solution and the alcohol or other liquid is allowed to evaporate. The iron particles adhere only to the magnetized areas and are visible thereon as at 15. Next, the drum is placed in a suitable fixture and exposed to a high intensity ultra-violet light source 16 in the manner conventional in the photo-engraving art. As the drum is rotated in the fixture, all areas of the drum which do not have the iron particles adhering thereto will be exposed to the light and hardened thereby. Those magnetized areas covered by the iron particles will remain undeveloped. Where it is desired to leave some tracks of the drum free for standard recording, these tracks can be masked before exposing the drum surface to the high intensity ultra-violet light, thereby preventing the emulsion under the masking from becoming hardened.

The drum is then taken from the fixture and developed. The iron particles and the unexposed emulsion, including the emulsion on those areas which may have been masked as described above, are washed away leaving the magnetized and masked areas of the drum surface unprotected.

At this point, the unprotected areas of the drum are flash plated as at 17 in Fig. 2 with a material which has different etch resistant characteristics from the magnetic material plated on the drum. By way of example only, the unprotected areas could be flash plated with gold, silver or rhodium. Thereafter, the hardened emulsion is removed by a suitable alkali solution. Now, when the drum is placed in an electric etching machine or a chemical etching bath, those areas covered by the plating material are not removed. However, all of the areas which were covered by the hardened enamel would be removed. The drum surface can be rinsed after these areas are removed. An electric etching machine which I have found to be suitable is that disclosed in Patent No. 2,536,912, granted to L. B. Corbett on January 2, 1951. Chemical etching machines are well known in the art and need not be described in detail herein.

The final appearance of the surface of the drum, after the nickel cobalt film is removed from between the magnetized areas, is illustrated in Fig. 3.

The drum produced in accordance with the method outlined above will have a plurality of tracks. The basic sync track, for example, will have a plurality of spaced lands of magnetic material separated by reliefs which are free of magnetic material. By placing the drum in the machine of which it will form a part, a permanent magnet may be placed adjacent the track. When the drum is rotated, the lands will be magnetized. The remaining sync tracks may contain a smaller number of lands which may be magnetized in a similar manner.

It will be remembered that it was pointed out that other tracks could be provided which would be identical with the basic snyc track. These other tracks may have the lands selectively magnetized under the control of the basic sync track in accordance with standard recording procedure. In other words, some of the lands in these other tracks may from time to time be magnetized or demagnetized as determined by the data to be recorded.

The tracks of the drum which were masked as described above will be in the form of a continuous land of magnetic material. These tracks can also be used for selective recording in accordance with standard procedure.

Those tracks containing tabular data will be in the form of lands separated by areas of nonmagnetic material. The lands will probably be spaced variable distances apart around the surface of the drum and may be magnetized in the same manner as the lands in the sync tracks were magnetized.

The procedure outlined above may be varied in a manner now to be described. Instead of recording the data in direct form on the drum, it may be recorded in complement. For example, if the binary number 1010011010 is to be recorded, in the first method described, all areas representing "1" would be magnetized. The areas representing "0" would remain unmagnetized. In this alternative method, the binary data would be changed into complement form and would appear as 0101100101.

The areas representing "1" would be magnetized and the areas representing "0" would remain unmagnetized. It will be seen that in this alternative method, the magnetized areas are those which are unmagnetized in the first method while the unmagnetized areas are those which were magnetized in the first method. Thus, in the second method, the information is recorded exactly opposite to that recorded in the first described method. Once a basic sync track is recorded on the drum it can now be used to place any other desired information in the drum, except that the other information will be recorded in complement form. That is, the areas which remain unmagnetized will eventually form the land which can be magnetized by passing it past a permanent magnet.

In this alternate embodiment, the same procedure is followed as shown in Fig. 1. However, instead of plating the magnetized areas as at 17 in Fig. 2, the drum is placed directly in the etching machine where the magnetized areas are etched away leaving the lands 18 on both sides of the reliefs 19, as shown in Fig. 4.

When etching is completed, the drum is removed from the machine and placed in a suitable alkali solution to remove the hardened resist which protected the lands during the etching operation. Afterwards the drum may be rinsed and dried.

As in the preferred embodiment described above, the lands which remain may be magnetized simply by rotating the drum and placing a permanent magnet adjacent the track whose lands are to be magnetized.

From the above detailed description, it will be apparent that I have provided a new and improved method of forming permanent data on magnetic record media. Should it be desired to not permanently magnetize the lands in some of the tracks, they may be selectively magnetized under the control of the basic sync track and the data to be recorded. The primary advantage of the present method over prior methods of producing permanent recordings is that the lands which remain are positioned precisely since they are produced as a result of an accurate magnetic recording. In this manner, it is unnecessary to employ special lathes for making the lands.

It will be appreciated that in the present invention the drum could have a large number of the basic sync tracks produced in accordance with the present invention. Thereafter, one of the sync tracks could serve as the basic sync track and the other tracks could have the lands therein selectively magnetized to produce whatever data is desired for a particular track. If the data in these other tracks should be lost for any reason, it could be rewritten from the basic sync in the manner in which the data was originally written. This assures that the rewritten data will always be in the same position in the track. This method also offers the possibility of changing the data in a particular track.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The method of producing a permanent record on a magnetizable record medium, comprising the steps of magnetizing areas in at least a selected portion of said record medium in a desired pattern, coating said selected portion with a light sensitive medium, exposing said selected portion to a dispersion of minute particles of magnetizable material which are attracted to said magnetized areas so that said particles mask the light sensitive medium over the magnetized areas, exposing said selected portion to a source of light which produces a differentiation insolubility between those areas of the light sensitive medium masked by the magnetizable particles and those areas not masked by the particles, developing said selected portion, and thereafter producing a plurality of reliefs in said selected portion separated by lands of magnetizable material including the step of subjecting said selected portion to an etching operation.

2. The method of producing a permanent record on magnetic record media, comprising the steps of coating a nonmagnetizable base with a magnetizable material, magnetizing areas in at least a selected portion of said magnetizable material in a desired pattern, coating said selected portion with a light sensitive emulsion, masking the light sensitive medium over said magnetized areas by placing said areas in a dispersion of magnetizable particles which are attracted to said areas, exposing said selected areas to a source of light which hardens the emulsion not covered by said particles, developing said selected portion, and subjecting said selected portion to an etching operation to produce a plurality of lands of magnetizable material separated by reliefs which are substantially void of magnetizable material.

3. The method of producing a permanent record on a magnetizable record medium, comprising the steps of coating a nonmagnetic base with a magnetizable material, magnetizing areas in at least a selected portion of said magnetizable material in a desired pattern, coating said selected portion with a light sensitive emulsion, bringing said selected portion into proximity to a plurality of minute magnetizable particles so that said particles can be attracted to said magnetized areas to mask the emulsion over said areas, exposing said selected portion to a source of light which hardens the emulsion not masked by said particles, plating the areas of said selected portion not masked by the hardened emulsion, and etching the areas not plated to remove the magnetizable material between the plated areas down to the nonmagnetic base.

4. The method of producing a permanent record in predetermined tracks of a magnetizable drum, comprising the steps of magnetizing areas in at least one track of said drum in accordance with a desired pattern, coating said track with a light sensitive emulsion, masking the light sensitive medium over said magnetized areas by placing said areas in proximity to a plurality of minute magnetizable particles which are attracted to said magnetized areas, exposing said track to a source of light which produces a difference in solubility between the areas masked by said particles and those not masked, developing said track to remove the emulsion over said magnetized areas, and producing a plurality of lands separated by reliefs in said track by a step including subjecting said track to an etching operation.

5. The method of producing a permanent record in predetermined tracks of a magnetizable drum, comprising the steps of producing a drum having a nonmagnetic outer periphery, coating said outer periphery with a magnetizable material, magnetizing areas in at least one track of said drum in accordance with a pattern, coating said track with a light sensitive emulsion, dipping said track in a bath having minute magnetizable particles therein which are attracted to the magnetized areas so as to mask the emulsion over said areas, exposing said track to a source of light which hardens the emulsion not covered by said particles, developing the emulsion covering said track and etching said track to produce a plurality of lands of magnetizable material separated by areas of the nonmagnetic base.

6. The method of producing a permanent record in predetermined tracks of a magnetizable drum, comprising the steps of producing a drum having a nonmagnetic outer periphery, coating said outer periphery with a magnetizable material, magnetizing areas in at least one track of said drum in accordance with a pattern, coating said track with a light sensitive emulsion, bringing said track into proximity to a plurality of magnetizable particles which are attracted to the magnetized areas so as to mask the emulsion over said areas, exposing said track to a source of light which hardens the emulsion not covered by said particles, developing said track, and etching said track to produce a plurality of lands of magnetizable material separated by areas of the nonmagnetic base, and magnetizing at least some of said lands.

7. The method of producing a permanent record on a magnetizable record medium, the steps including magnetizing areas in at least a selected portion of a record medium in a desired pattern, coating said selected portion with a light sensitive medium, masking the light sensitive medium over said magnetized areas by placing said areas in a dispersion of said magnetizable particles which are attracted to said areas, exposing said selected portion to a source of light which produced a difference in solubility between the masked and unmasked areas, developing said selected portion to remove the emulsion over said magnetized areas, producing a plurality of reliefs in said selected portion including the step of etching said selection portion.

References Cited in the file of this patent

UNITED STATES PATENTS

| | | |
|---|---|---|
| 1,590,399 | Tykocinski-tykociner | June 29, 1926 |
| 2,297,691 | Carlson | Oct. 6, 1942 |
| 2,459,129 | Gresham et al. | Jan. 11, 1949 |

UNITED STATES PATENT OFFICE

CERTIFICATE OF CORRECTION

Patent No. 2,881,073 April 7, 1959

William R. Maclay

It is hereby certified that error appears in the printed specification of the above numbered patent requiring correction and that the said Letters Patent should read as corrected below.

Column 5, line 19, for "insolubility" read -- in solubility --; column 6, line 47, strike out "said", second occurrence; line 49, for "produced" read -- produces --.

Signed and sealed this 4th day of August 1959.

(SEAL)
Attest:

KARL H. AXLINE
Attesting Officer

ROBERT C. WATSON
Commissioner of Patents